W. BECHSTEIN.
ILLUMINATING APPARATUS FOR PHOTOGRAPHIC CAMERAS.
APPLICATION FILED JULY 9, 1913.
1,097,211.
Patented May 19, 1914.
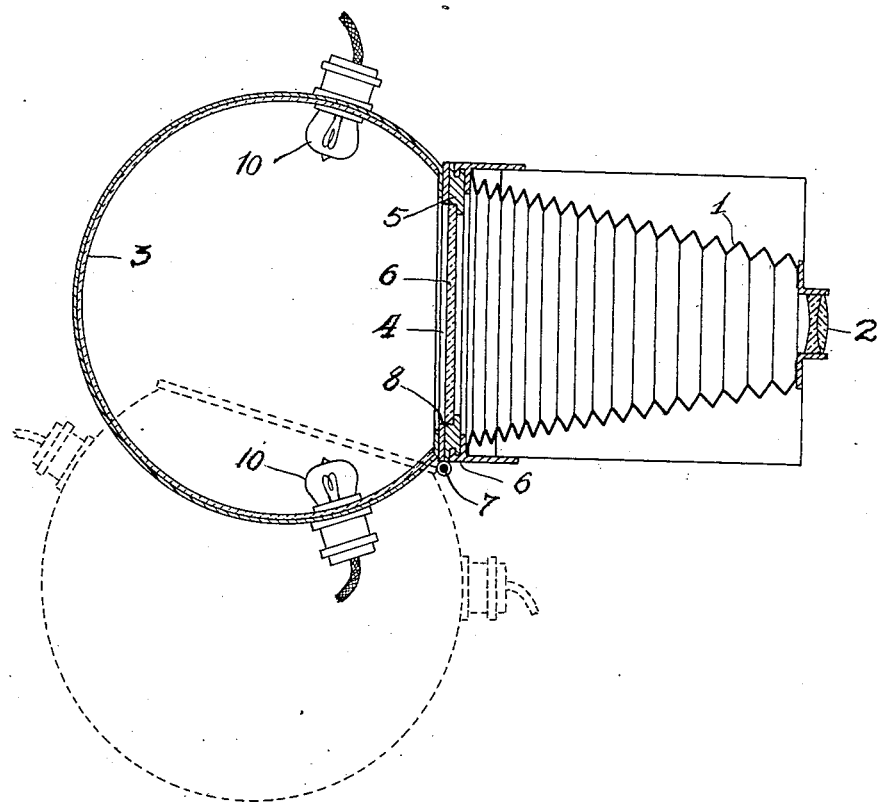
WITNESSES:
INVENTOR
Walther Bechstein,
BY Carl P. Goepel
ATTORNEY

UNITED STATES PATENT OFFICE.

WALTER BECHSTEIN, OF BERLIN, GERMANY, ASSIGNOR TO FRANZ SCHMIDT & HAENSCH, OF BERLIN, GERMANY.

ILLUMINATING APPARATUS FOR PHOTOGRAPHIC CAMERAS.

1,097,211.  Specification of Letters Patent.  Patented May 19, 1914.

Application filed July 9, 1913. Serial No. 778,008.

*To all whom it may concern:*

Be it known that I, WALTER BECHSTEIN, citizen of the German Empire, and residing at Berlin, Germany, have invented certain new and useful Improvements in Illuminating Apparatus for Photographic Cameras, of which the following is a specification.

My invention relates to an illuminating apparatus, which can be removably fastened to a photographic camera of any construction, and then forms, in combination with the camera, a photographic enlarging apparatus or a projection apparatus.

The novel feature of my device is that this illuminating device, which is adapted to be removably mounted in suitable manner on a photographic camera, has the form of a spherical or approximately spherical casing, which has on its inner side a surface adapted to reflect by diffusion and which moreover, carries in its interior the sources of light, *e. g.* electric lamps, these being so arranged that the rays which issue from the sources of light cannot fall directly on the object-glass of the photographic camera.

One illustrative embodiment of my invention is represented, by way of example, in the accompanying drawing, showing a horizontal section of a camera with the illuminating device attached thereto, some parts, in particular the camera, being, however, shown only diagrammatically.

1 represents a camera of any form, and 2 the object-glass. In the drawing a folding bellows-camera is shown, but the camera may have any other known form without affecting the essence of my invention. In order to obtain in a very simple manner, by the use of such a camera, an enlarging or projection apparatus, I arrange at that place at which the dark slide for the sensitized plate is fastened to the camera, a removable illuminating device, which comprises a casing 3 of spherical or approximately spherical form. To fasten the casing 3 to the camera, the former is first provided with an opening 4, which is bounded by a suitable carrier, this preferably simultaneously serving as the device for removably attaching the casing 3 to the camera. In the example illustrated this carrier consists of two parts; one of these, the outer frame-like carrier 5, has side grooves and can consequently be secured like a dark-slide, behind the corresponding beads 6 on the camera casing, either below, or above, or at the side. On this outer frame-like carrier 5 is pivotally connected by means of a hinge 7 the inner frame-like carrier 8, which bounds the opening proper 4 of the spherical casing 3 and is fast on this casing itself. If the outer carrier 5 is fitted in the camera casing like a dark-slide, the spherical casing 3 together with its carrier 8 can be placed either in the position indicated by full lines, *e. g.* when the frame 5 contains a picture 9 which has to be enlarged or projected, or, after such projection, can be readily rotated on the hinge 7 and thus take up the position shown in dotted lines, whereby free access to the picture 9 is obtained and the latter can be readily exchanged. My invention is not however limited to one particular form of fastening device. Instead of the two-part frame-like carrier illustrated, a one-part carrier may be employed; then, however, other suitable methods are required for inserting and withdrawing the picture to be projected; *e. g.* slots can be formed in the carrier either at the sides, above, or below, by means of which slots the pictures to be projected can—as is usual in projection apparatus—be inserted, withdrawn or changed by means of known slides or frames of various kinds. It is also, of course, obvious that the means for fastening the frame or the illuminating device to the camera can be formed in other desired manner without affecting the essence of my invention. It is important only that the illuminating device has a spherical or approximately spherical casing, and that this casing has on its inner side a white surface adapted to reflect by diffusion, and not a mirror-like surface.

Within the spherical casing 3 are arranged sources of light of any suitable kind. In the example incandescent lamps 10 are employed, which can be fed either by alternating or direct current and can be readily connected to the supply circuit by means of a contact-plug; my illuminating apparatus can be therefore operated even by an amateur photographer, without difficulty. It is obvious, however, that instead of electric incandescent lamps, other sources of light can be arranged without affecting the essence of my invention among which sources may be mentioned electric arc lamps and incandescent-gas lamps. In every case, however, the sources of light must be so mounted within the spherical casing 3 that the light-rays issuing from these sources of light do not fall directly on the object-glass 2 of the photographic camera, because, if they did so fall, they would prejudicially influence the projection of the inserted picture 9. Consequently, in my construction of illuminating apparatus, the inserted picture 9 is illuminated directly, on the one hand, by the light-rays issuing from the sources of light 10, and indirectly, on the other hand, by the white surface of the casing 3 which is adapted to reflect by diffusion. In this way the whole of the light issuing from the sources thereof is utilized in a very advantageous manner for illuminating the picture so that, as experiments have proved, even when incandescent lamps are employed the picture is very intensely illuminated, and consequently a sharply-defined and bright enlargement or projection on the sensitive film or sheet, respectively, can be obtained. Hence if the owner of a photographic camera simply provides himself with my improved illuminating device which can be detachably fastened to his camera, he can utilize the latter in a much more advantageous and cheaper manner than by providing himself with the ordinary enlarging and projection apparatus.

I claim:—

1. The combination with a camera having an object-glass, of a substantially spherical casing, having an opening, detachably connected at the opening to said camera, said casing having an internal white surface adapted to reflect light by diffusion, and a source of light so mounted in the casing that all the unreflected rays of light from said source fall outside the object-glass.

2. The combination with a camera having an object-glass, of a substantially spherical casing, having an opening, a frame fastened to said casing at said opening and detachably connected to said camera, said casing having an internal white surface adapted to reflect light by diffusion, and a source of light so mounted in the casing that all the unreflected rays of light from said source fall outside the object-glass.

3. The combination with a camera having an object-glass, of a substantially spherical casing, having an opening, detachably and pivotally connected at the opening to said camera, said casing having an internal white surface adapted to reflect light by diffusion, and a source of light so mounted in the casing that all the unreflected rays of light from said source fall outside the object-glass.

In testimony, that I claim the foregoing as my invention, I have signed my name in presence of two subscribing witnesses.

WALTER BECHSTEIN.

Witnesses:
 WOLDEMAR HAUPT,
 HENRY HASPER.

---

Copies of this patent may be obtained for five cents each, by addressing the "Commissioner of Patents, Washington, D. C."